United States Patent [10] Patent No.: US 9,473,193 B2
Lundstedt et al. [45] Date of Patent: Oct. 18, 2016

(54) MOBILE TERMINAL WITH FREQUENCY LOCK LOOP

(71) Applicant: Hughes Network Systems, LLC, Germantown, MD (US)

(72) Inventors: Jack Lundstedt, Monrovia, MD (US); John Schmid, Darnestown, MD (US); Guy Montgomery, Potomac, MD (US); Bahman Salamat, Bethesda, MD (US); George Eapen, Boyds, MD (US); Yeqing Tang, North Potomac, MD (US); Brian Smith, Mount Airy, MD (US)

(73) Assignee: Hughes Network Systems, LLC, Germantown, MD (US)

( * ) Notice: Subject to any disclaimer, the term of this patent is extended or adjusted under 35 U.S.C. 154(b) by 3 days.

(21) Appl. No.: 14/584,185

(22) Filed: Dec. 29, 2014

(65) Prior Publication Data

US 2016/0173162 A1 Jun. 16, 2016

Related U.S. Application Data

(60) Provisional application No. 62/091,193, filed on Dec. 12, 2014.

(51) Int. Cl.
*H04B 1/40* (2015.01)
*H04W 4/02* (2009.01)
*H04B 1/04* (2006.01)

(52) U.S. Cl.
CPC ............ *H04B 1/40* (2013.01); *H04W 4/027* (2013.01); *H04B 2001/0491* (2013.01)

(58) Field of Classification Search
CPC ........ H04W 4/027; H04B 1/40; H04B 1/403
USPC ........ 455/73, 76, 91, 165.1, 183.1, 258, 259, 455/260, 264
See application file for complete search history.

(56) References Cited

U.S. PATENT DOCUMENTS 6,230,021 B1 * 5/2001 Ohdachi ................. H03J 7/065
370/324

\* cited by examiner

*Primary Examiner* — Tuan Pham
(74) *Attorney, Agent, or Firm* — Bejin Beineman PLC

(57) ABSTRACT

A mobile terminal for satellite communications receives communication, e.g., from a gateway via a satellite link. A frequency lock loop unit locks to the carrier frequency of the received communication. The mobile terminal includes a global positioning system for receiving global positioning data. The mobile terminal determines the Doppler frequency shift of the received communications based on the global positioning data. The mobile terminal generates a reference clock for return transmissions based on the frequency of the frequency lock loop, corrected for the Doppler shift. A correction factor of two times the determined Doppler frequency shift is used, to compensate for both a forward and return transmission link.

21 Claims, 3 Drawing Sheets

MOBILE TERMINAL WITH FREQUENCY LOCK LOOP

CROSS-REFERENCE TO RELATED APPLICATIONS

The subject patent application claims priority to and all the benefits of U.S. Provisional Patent Application No. 62/091,193 filed on Dec. 12, 2014, which is herein incorporated by reference in its entirety.

BACKGROUND

Radio communications between a gateway and a mobile terminal, e.g., in an airplane require tight control of transmit frequencies in order to provide a reliable communications link and to avoid interference between neighboring transmission channels. The carrier frequency of a transmitted signal, as transmitted by a mobile terminal, is subject to a Doppler frequency shift related to the location and velocity of the mobile terminal. The Doppler shift can be large compared to the available budget for the frequency variation of transmissions, and may use most of, or exceed, this budget. Further, a gateway may communicate with multiple mobile terminals, each with a different Doppler shift, making compensation at the gateway difficult.

DRAWINGS

DETAILED DESCRIPTION

Overview

Figure 1:
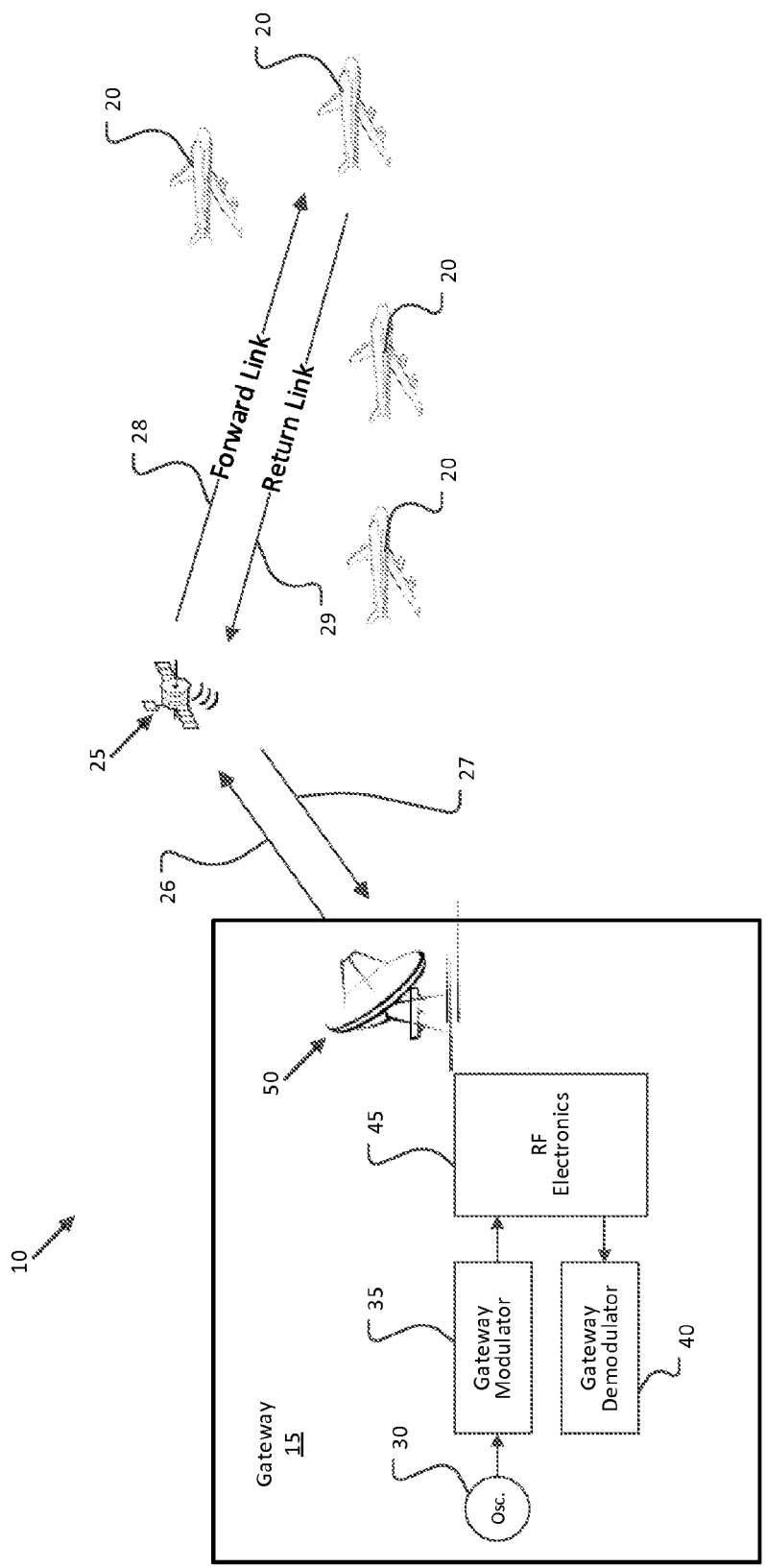
FIG. 1 is a block diagram of an exemplary system for radio frequency transmission between a gateway and a mobile terminal.

FIG. 1 is a block diagram of an exemplary system 10 for radio frequency communications between a gateway 15 and one or more mobile terminals 20, the communications being relayed by one or more communications satellites 25, sometimes referred to as satellite links 25. The mobile terminal 20 is typically mounted on an airplane. The mobile terminal 20 receives an outbound signal from the gateway 15, generally via the satellite link 25, the received outbound signal being influenced by a Doppler shift. The Doppler shift results from motion of the airplane that affects the frequency of the outbound signal as it is transmitted from the satellite link 25 to the mobile terminal 20. The received outbound signal is also referred to herein as a shifted outbound signal.

The mobile terminal 20 extracts a shifted reference signal from the shifted outbound signal. A frequency lock loop (FLL), using the shifted reference signal as an input, generates an output reference clock. The output reference clock is used to generate return transmit signals from the mobile terminal 20 to the gateway 15. A Doppler shift of a carrier frequency of the shifted outbound signal is calculated using positioning data based on the location and velocity of the mobile terminal 20 relative to the satellite link 25. For example, the positioning data may be global positioning data received from a global positioning system (GPS) or positioning data received from sensors in an inertial reference unit (IRU), etc.

Based in part on the Doppler shift, the mobile terminal 20 generates a return carrier to be used to generate the return transmit signal. More specifically, the return carrier is generated on the basis of a shifted outbound carrier frequency, and includes compensation for the Doppler shift. Because the Doppler shift generally occurs with both a forward link 28 from the satellite link 25 to the mobile terminal 20, and with a return link 29 from the mobile terminal 20 to the satellite link 25, the mobile terminal 20 generates the return carrier by adjusting the shifted outbound carrier frequency based on twice the value of the calculated Doppler shift. The frequency of the return carrier may also be scaled in order to use a separate return carrier frequency.

A frequency lock loop (FLL) 105 in the mobile terminal 20 locks to the shifted reference signal, and, in cooperation with a frequency synthesizer, generates the return carrier, thereby advantageously eliminating the need for an expensive frequency reference on the mobile terminal 20. Additionally, correspondence between the return transmit signals received from the mobile terminals 20 resulting from the Doppler correction allows the gateway 15 to receive the return transmit signals within a limited frequency (acquisition) range, reducing the need to adjust for variations between the frequencies of the return transmit signals from different mobile terminals 20.

The system 10, and process steps carried out in the system 10, are described further below. Moreover, a glossary of certain terms used in this disclosure is provided below for the convenience of the reader.

Exemplary System Elements

As stated above, the communication system 10 includes a gateway 15, one or more mobile terminals 20, and one or more communications satellites 25. The gateway 15 is typically a land based transmission system such as is known. The gateway 15 may communicate with multiple mobile terminals 20 substantially simultaneously, managing large amounts of incoming and outgoing data, and generating radio frequency transmissions at power levels sufficient to reach communications satellites 25. Types of communications that may be provided from the gateway 15 to the mobile terminals 20 may include Internet or other packet network access, telephone communications, audio and video transmissions, communications related to guidance systems, etc. The gateway 15 generates and transmits outbound signals to the satellite link 25 via an uplink 26. The satellite 25 receives the transmissions, and relays the transmissions to the mobile terminals 20 via the forward link 28.

Typically, satellite communications are conducted in the Ku band, a radio frequency band from 12 GHz to 14 GHz. Within the Ku band, different frequencies are typically used for communication to the satellite link 25 and from the satellite link 25. For example, communications from the gateway 15 or the mobile terminal 20 to the satellite link 25 may be conducted in the 14 GHz range, and transmissions from the satellite link 25 to the gateway 15 and the mobile terminal 20 may be conducted in the 12 GHz range.

Other frequency bands may be used for satellite communications. Examples of other suitable frequency bands for use by the system 10 are the C-band from 5.85 to 6.725 GHz and the Ka band from 29.5 to 30.0 GHz.

As further shown in FIG. 1, the gateway 15 includes various known elements such as a stable reference oscillator 30, a gateway modulator 35, a gateway demodulator 40, RF electronics 45 and one or more antennas 50.

The stable reference oscillator 30 generates a high precision reference clock signal, used as a time base for the gateway modulator 35. This high precision clock signal will be referred to as the gateway reference clock herein. Typically, the oscillator 30 is a 10 MHz oscillator. The oscillator 30 may be locked to an external frequency source, such as a frequency reference generated by a global positioning system (GPS). When locked to an external frequency source, the oscillator may maintain stability <1 parts per billion (ppb). At an operating frequency of 10 MHz, this is <0.01 Hz. When not locked to an external frequency source, the oscillator may maintain a stability <5 ppb. In order to provide this level of clock stability, the oscillators 30 are typically quartz oscillators operated in a controlled temperature environment. Other types of oscillators may be used.

The gateway modulator 35 generates an outbound carrier based on the gateway reference clock. The gateway modulator 35 further constructs signals, e.g., according to a known signal protocol for transmission to the mobile terminals 20. Examples of such signal protocols are TDM, bursted TDM, bursted TDMA, etc. Typically, for example, signals received by the remote terminal 20 are TDM formatted signals, and return transmit signals transmitted by the remote terminal 20 are bursted TMDA formatted signals. The modulator 35 outputs the signals to the RF electronics 45.

The RF electronics 45 converts the signals received from the gateway modulator 35 to radio frequency signals for transmission to the satellite link 25. The RF electronics 45 also increases the power level of the signals to a level sufficient to transmit the signals to the satellite links 25. The RF electronics 45 transmits, via the antenna 50, the outbound signal to the satellite link 25.

A satellite link 25 includes a radio frequency relay station, such as is known. Communications between the gateway 15 and the satellite link 25 occur via an uplink 26 and a downlink 27. The one or more satellite links 25 receive outbound signals from the gateway 15 via the uplink 26. A satellite link 15 relays an outbound signal via a forward link 28 to a mobile terminal 20. The mobile terminal 20 provides return transmit signals to one or more satellite links 25 via a return link 29. The satellite link 25 in turn relays the return transmit signal received from the mobile terminal 20 to the gateway 15 via the downlink 27. Each satellite link 25, as is known, includes a first receiver for receiving outbound signals from the gateway 15, a first transmitter for relaying the outbound signals to the mobile terminal 20, a second receiver for receiving return transmit signals from the mobile terminals 20, and a second transmitter for relaying the return transmit signals to the gateway 15.

Figure 2:
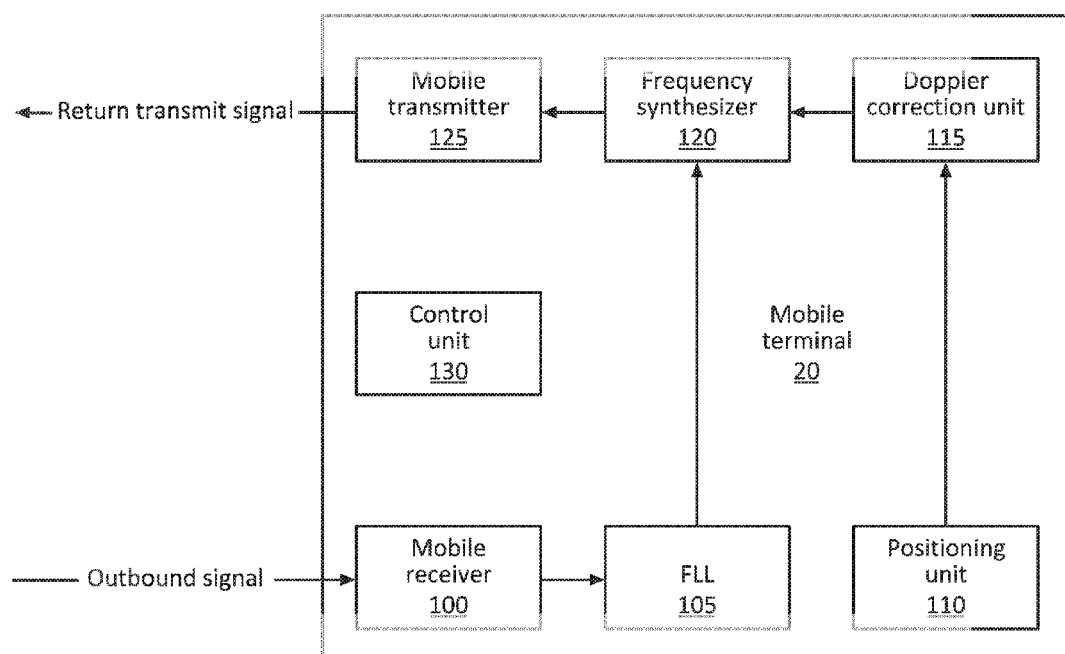
FIG. 2 is a block diagram of the mobile terminal of FIG. 1, including a Doppler frequency correction unit.

As shown in FIG. 2, each mobile terminal 20 includes a mobile receiver 100, a frequency lock loop (FLL) 105, a positioning unit 110, a Doppler correction unit 115, a frequency synthesizer 120, a mobile transmitter 125 and a control unit 130. As noted above, the mobile terminals 20 receive communications from the gateway 15 via the satellite link 25. In addition, the mobile terminals 20 transmit communications to the gateway 15, also via the satellite link 25. As described in detail below, the return transmit signals transmitted from the mobile terminals 20 to the gateway 15 are adjusted to compensate for a first Doppler shift that occurs on the forward link 28 and a second Doppler shift that occurs on the return link 29.

The mobile receiver 100 receives shifted outbound signals from the gateway 15. The receiver 100 demodulates the communication, and extracts a shifted outbound carrier signal from the shifted outbound signal. The receiver 100 further derives a shifted reference signal from the shifted outbound carrier signal. The receiver 100 then provides the shifted reference signal as an input to the FLL 105.

Due to the Doppler Effect, the shifted outbound carrier signal is shifted in frequency relative to an outbound carrier signal as transmitted from the gateway 15. The Doppler frequency shift varies according to the relative velocity and location of the mobile terminal 20 with respect to the satellite link 25. For example, the Doppler shift at Ku band (12-14 GHz), for an airplane travelling at 500 MPH, may be on the order of 10 kHz.

The frequency of the shifted reference signal is generally the frequency of the gateway 15 reference clock, altered because of the Doppler effect. Specifically, at the gateway 15, the frequency of the outbound carrier is generated by multiplying the gateway 15 reference clock by a scale factor determined to achieve a target frequency for the outbound carrier. At the mobile terminal 20, the frequency of the (received) shifted outbound carrier may be divided by the same scale factor to generate the shifted reference signal. In this manner, the frequency ratio of the gateway 15 reference clock to the shifted reference signal is substantially the same as the frequency ratio of the outbound carrier to the shifted outbound carrier.

The FLL 105 generates an output reference clock with a frequency that is substantially equal to the shifted reference signal. The FLL 105 compares the FLL 105 output reference clock to the shifted reference signal that, as mentioned above, is derived from the shifted outbound carrier signal. Through control circuitry, the FLL 105 adjusts the frequency of the FLL 105 output reference clock until the frequency of the FLL 105 output reference clock substantially matches the shifted reference signal. Accordingly, the frequency of the FLL 105 output reference clock will be the same or substantially the same as the frequency of the shifted reference signal, including any frequency shifts resulting from the Doppler shift to the shifted outbound carrier signal.

In the example above, the frequency of the shifted reference signal supplied to the FLL 105 is substantially equal to the gateway 15 reference clock, altered because of the Doppler effect. Other reference signals (frequencies), extracted from the shifted outbound signal, may be used as a reference signal to the FLL 105. The FLL 105 may lock to the other reference signal, and scale the lock frequency to generate the output reference clock.

The FLL 105 updates the frequency of the output reference clock frequently enough to maintain an accuracy on the order of 3-4 parts per billion. This equates to an accuracy of approximately +/−100 Hz for an FLL 105 operating in the Ka band (29.5 to 30 GHz). In order to maintain this level of accuracy, the FLL 105 output reference clock frequency is typically updated once every 8 mS.

The mobile terminals 20 can accommodate receiving a Doppler shifted outbound signal from the gateway 15. However, the gateway 15 may service a large number (e.g., thousands) of mobile terminals 20. It is impractical to receive return transmit signals from such a number of mobile terminals 20 that vary widely in carrier frequency. In order to maintain the carrier frequencies of return transmit signals within a narrow frequency range, it is desirable to compensate the return transmit signals for the Doppler shift of the forward and return links 28, 29. Compensating the frequency of the return transmit signals for the Doppler shift of the forward and return links 28, 29 is described further below.

Each mobile terminal 20 includes a positioning unit 110. The positioning unit 110 may be a global positioning system (GPS), or an inertial reference unit (IRU), or another type of positioning system.

The positioning unit 110 includes a computer, and may include a GPS receiver for receiving communications from GPS satellites as are known. The positioning unit 110 may receive communication from GPS satellites, and, based on this communication, may determines the position and velocity of the mobile terminal 20 relative to the satellite link 25. The positioning unit 110 provides the data to the Doppler correction unit 115.

Alternatively, and by way of example, the positioning unit 110 may be an inertial reference unit, and may include a computer and sensors; i.e., accelerometers, gyroscopes, etc. The positioning unit 110 may receive positioning data from the sensors. Based on the positioning data, the positioning unit 110 may determine the location, velocity and acceleration of the mobile terminal 20.

Other systems for determining the location and velocity of the mobile terminal 20 may be used. Also, as discussed below, the determination of location and velocity may be done by a control unit 130 based on data received from the positioning unit 110.

For example, the positioning unit 110 may receive data from a GPS satellite corresponding to the location of mobile terminal 20 once per second. The satellite link 25 location may be determined according to a known orbit of the satellite link 25. Based on the location data from two different time points, for example, one second apart, the velocity of the mobile terminal 20 may be determined. Based on known location of the satellite link 25, the location and velocity of the mobile terminal 20 relative to the satellite link 25, may be calculated. The calculation may be performed in the computer of the positioning unit 110. Alternatively, the calculation may be performed in the control unit 130, or another computer within, or external to the mobile terminal 20.

The Doppler correction unit 115 includes a processor and a memory and may be programmed to receive data from the positioning unit 110, and to calculate a Doppler correction factor based on the received positioning data. The Doppler correction factor is used to compensate the frequency of the shifted outbound carrier signal carrier to generate a return carrier for the mobile terminal 20 transmitter 125. The Doppler correction factor further corrects for the estimated Doppler shift from the mobile terminal 20 to the gateway 15 over the return link 29.

As a first step for calculating the Doppler correction factor, the estimated Doppler shift to the outbound signal that was received in the mobile terminal 20 over the forward link 28 is determined. This determination is made in a known manner, e.g., based on the location and velocity of the mobile terminal 20, relative to the satellite link 25. Note that the Doppler shift over the return link 29 is typically substantially equal to the Doppler shift over the forward link 28. The Doppler correction factor must account for two Doppler shifts; a first Doppler shift over the forward link 28 which is reflected in the FLL 105 output reference clock, and a second Doppler shift to the return transmit signal over the return link 29. Thus, the Doppler correction factor is calculated to be double the estimated Doppler shift of the outbound signal over the forward link 28.

Note that the Doppler shift of the shifted (received) outbound signal has a magnitude and may be positive (increased frequency relative to the transmitted signal) or negative (decreased frequency relative to the transmitted signal). The Doppler correction is double the magnitude, and opposite in sign, from the determined Doppler shift $f_{ds}$ of the received outbound signal. The frequency $f_{rc}$ of the return carrier may be generated to be equal to the frequency $f_{soc}$ of the shifted outbound carrier minus 2 times $f_{ds}$, i.e., $f_{rc}=f_{soc}-2f_{ds}$. Typically, in addition to adjusting the frequency of the outbound signal for Doppler shift, is the frequency of the outbound signal is also scaled. For example, if the frequency of the outbound carrier was 14 GHz, the frequency of the return carrier may be 12 GHz. This scaling may be determined in the Doppler correction unit 115 and applied to the frequency synthesizer 120 as is known.

The frequency synthesizer 120 generates a return carrier for the mobile transmitter 125 based on the frequency of the output reference clock of the FLL 105 and the Doppler correction factor. The synthesizer 120 receives the FLL 105 output reference clock and the Doppler correction factor as inputs, and outputs the return carrier to the mobile transmitter 125.

The mobile transmitter 125 generates the return transmit signal based on the return carrier. The mobile transmitter 125 transmits the return transmit signal to the gateway 15 via the return link 29, satellite link 25 and downlink 27. The return transmit signal is received by the gateway 15 demodulator 40.

The mobile terminal 20 may further include a control unit 130. The control unit 130 may be communicatively coupled with the mobile receiver 100, FLL 105, positioning unit 110, Doppler correction unit 115, frequency synthesizer 120 and mobile transmitter 125. The control unit 130 includes a processor to execute programs stored in memory, such as a program including computer-executable instruction for process 200 described below. The control unit 130 may further be programmed, for example, to perform the calculations associated with the determination of the mobile terminal 20 location and velocity, determination of the satellite link 25 location and velocity, calculation of the Doppler shift corresponding to the relative location and velocity of the mobile terminal 20 with respect to the satellite link 25, etc. Some or all of these determinations and/or calculations may be made in the control unit 130, or any other computer or computing device, including computers or computing devices external to the mobile terminal 20.

Exemplary Process Flow

Figure 3:
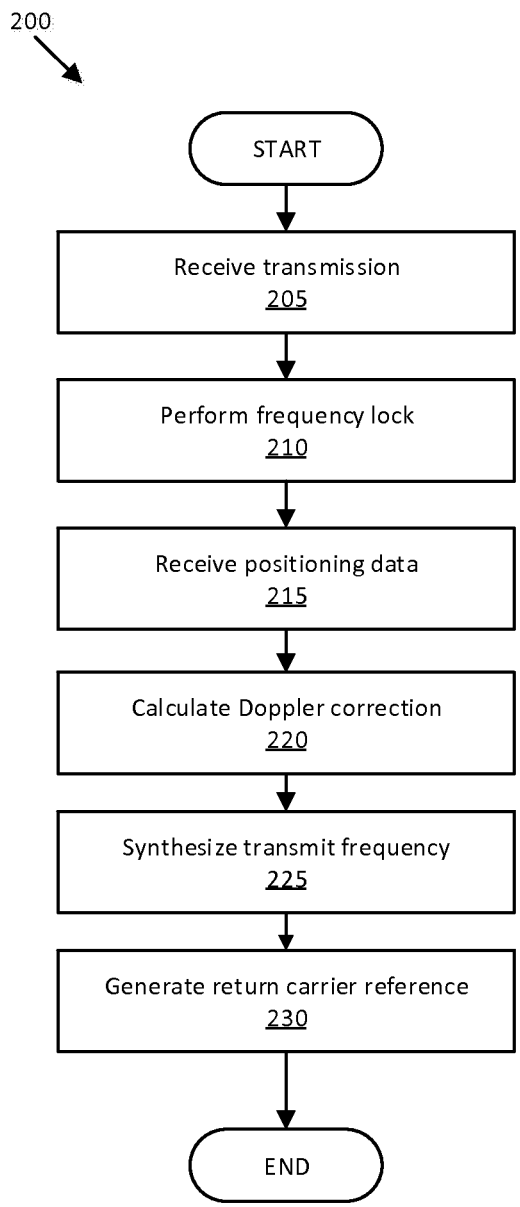
FIG. 3 is a diagram of an exemplary process for receiving a Doppler shifted signal and generating a Doppler corrected clock for return transmissions.

FIG. 3 is a diagram of an exemplary process 200 for compensating satellite communications from a mobile terminal 20 to a gateway 15 for Doppler frequency shift associated with the location and velocity of the mobile terminal 20 relative to the satellite link 25.

In a block 205, as described above, a mobile receiver 100 in a mobile terminal 20 receives an outbound signal from the gateway 15 via the satellite link 25, the outbound signal affected by a Doppler shift, e.g., because of a velocity of a vehicle in which the mobile terminal 20 is included. The mobile receiver 100 extracts a shifted reference signal from the received shifted outbound signal. The mobile receiver 100 outputs the shifted reference signal to the FLL 105. The process continues in a block 210.

In the block 210, the FLL 105 receives the shifted reference signal as an input. The FLL 105 compares the frequency of the shifted reference signal with the frequency of the FLL 105 output reference clock. As described above, based on the comparison, the FLL 105 adjusts the frequency of the FLL 105 output reference clock until the frequency of the FLL 105 output reference clock is the same or substantially the same as the frequency of the shifted reference signal. The process then continues in a block 215.

In the block 215, the positioning unit 110 determines the velocity and location of the mobile terminal 20. The positioning unit 110 may be a GPS receiver. The GPS receiver may receive GPS data from a GPS satellite or other GPS transmitter as is known. The GPS data may include data corresponding to the location and/or velocity of the mobile terminal 20. The GPS data may further include location and/or velocity data of the satellite link 25. Based on the GPS data, the positioning unit 110 or another computer generates, according to known methods, a relative location and velocity of the mobile terminal 20 with respect to the satellite link 25.

Alternatively, the positioning unit 110 may be an inertial reference unit. The inertial reference unit may include sensors and receive position data from the sensors as described above.

The relative velocity and location of the mobile terminal 20 may be determined by the computer in the positioning unit 110. Alternatively, the control unit 130 or another computer may determine the relative location and velocity of the mobile terminal 20. The relative location and velocity of the mobile terminal 20 with respect to the satellite link 25 are provided to the Doppler correction unit 115. The process continues in a block 220.

In the block 220, as described above, the Doppler correction unit calculates an estimated Doppler shift of the shifted outbound carrier. Based on the relative location and velocity, the Doppler correction unit 115 calculates a Doppler frequency shift of the outbound carrier over forward link according to known methods. Because the Doppler correction factor must account for both the Doppler frequency shift over the forward link 28, and a Doppler frequency shift over the return link 29, the Doppler correction unit 115 calculates the Doppler correction factor to be equal to twice the Doppler frequency shift of the forward link 28. The Doppler correction unit 115 may also determine a scaling factor to adjust the frequency of the shifted outbound carrier to a return carrier frequency. The process continues in a block 225.

In the block 225, again as described above, the frequency synthesizer 120 generates a return carrier based on the FLL 105 output reference clock and the Doppler correction factor. The frequency synthesizer 120 receives the FLL 105 output reference clock and Doppler correction factor as inputs. Based on the received inputs, the frequency synthesizer 120 generates the return carrier to have a frequency substantially equal the frequency of the shifted outbound carrier signal, adjusted by the Doppler correction factor. The frequency synthesizer 120 may additionally apply the scaling factor determined by the Doppler correction unit 115. The frequency synthesizer 120 outputs the return carrier to the mobile transmitter 125. The process continues in a block 230.

In the block 230, the mobile transmitter 125 generates a return transmit carrier signal based on the return carrier supplied from the frequency synthesizer 120. The mobile transmitter 125 communicates with the gateway 15, via the satellite link 25 on the basis of the return transmit carrier signal.

The computers in the positioning unit 110, Doppler correction unit 115 and control unit 130 could be the same computer, or multiple computers communicatively coupled within the mobile terminal 20. Some of the calculations may also be performed by computers mobile to the mobile terminal 20.

GLOSSARY OF TERMS

The following glossary of terms used in this disclosure is provided for the convenience of the reader.

Gateway 15 reference clock: A reference time base, typically 10 MHz, used by the gateway 15 in generating other signals. The gateway 15 reference clock is highly stable.

Outbound signal: A signal transmitted from the gateway 15, e.g., to one or more mobile terminals 20.

Outbound carrier: The carrier signal used to generate an outbound signal from the gateway 15. Typically, the frequency of the outbound carrier will be on the order of 14 GHz. The frequency of the outbound carrier is proportional to the frequency of the gateway 15 reference clock by a scale factor to generate a target carrier frequency from the frequency of the gateway 15 reference clock. That is, the frequency of the outbound carrier equals the frequency of the gateway 15 reference clock multiplied by the scale factor.

Shifted outbound signal: The shifted outbound signal is the outbound signal as received at the mobile terminal. It includes a Doppler shift resulting from the velocity and location of the mobile terminal relative to the satellite link 25 that relayed the outbound signal. The shifted outbound signal may be on the order of 14 GHz, shifted either up or down based on the Doppler shift.

Shifted reference signal: The shifted reference signal is a signal derived from the shifted outbound signal. The frequency of the shifted reference signal is equal to the frequency of the shifted outbound signal divided by the scale factor. The frequency of the shifted reference is on the order of 10 MHz, altered by the Doppler shift.

First Doppler shift: The first Doppler shift refers to the shift in frequency between the outbound signal (as transmitted from the gateway 15) and the shifted outbound signal (as received by the mobile terminal 20).

Second Doppler shift: The second Doppler shift refers to the shift in frequency between the return transmit signal (as transmitted from the mobile terminal 20) and frequency of a shifted return transmit signal (as received by the gateway 15).

Doppler correction factor: The Doppler correction factor is calculated to be twice the Doppler shift. The Doppler correction factor is therefore a frequency. The Doppler correction factor may be subtracted from the frequency of the shifted outbound carrier to generate a Doppler corrected return carrier. Typically, the return carrier will also be scaled to a different frequency following the Doppler correction.

Output reference clock: The outbound reference clock is a clock generated by a frequency lock loop. The frequency of the outbound reference clock is the same, or substantially the same as the frequency of the shifted reference signal.

Return carrier: The return carrier is a reference signal used to generate return signals. As such, the return carrier performs the same role for mobile terminal transmissions that the outbound carrier performs for gateway 15 transmissions. The frequency of the return carrier will typically be the frequency of the outbound carrier, adjusted with the Doppler correction factor, and then scaled to a different frequency band.

As used herein, the adverb "substantially" means that a shape, structure, measurement, quantity, time, etc. may deviate from an exact described geometry, distance, measurement, quantity, time, etc., because of imperfections in materials, machining, manufacturing, etc.

In the drawings, the same reference numbers indicate the same elements. Further, some or all of these elements could be changed. With regard to the components, processes, systems, methods, etc. described herein, it should be understood that these are provided for the purpose of illustrating certain embodiments, and should in no way be construed so as to limit the claimed invention.

Accordingly, it is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

The invention claimed is:

1. A mobile terminal comprising a computer including a processor and a memory, the memory storing instructions such that the processor is programmed to:
   cause a reference signal that has been extracted from a received signal to be provided to a frequency lock loop to generate an output reference clock based on the reference signal;
   determine an estimated Doppler shift of the received signal based at least in part on a velocity of the mobile terminal;
   instruct a frequency synthesizer to generate a return carrier based at least in part on the output reference clock and the estimated Doppler shift; and
   instruct a transmitter to transmit a return transmit signal based at least in part on the return carrier.

2. The mobile terminal of claim 1, wherein the processor is further programmed to:
   determine the estimated Doppler shift of the received signal based in part on a position of the mobile terminal.

3. The mobile terminal of claim 2, wherein the frequency of the return carrier is compensated for a first Doppler shift of the received signal from a gateway to the mobile terminal, and a second Doppler shift of the return transmit signal from the mobile terminal to the gateway.

4. The mobile terminal of claim 2, wherein the processor is further programmed to:
   receive positioning data of the mobile terminal; and
   determine the position and the velocity of the mobile terminal based on the positioning data.

5. The mobile terminal of claim 4, wherein the Doppler shift is determined based on the positioning data at a first time and a second time.

6. The mobile terminal of claim 1, wherein the frequency lock loop locks to the frequency of the reference signal.

7. The mobile terminal of claim 1, wherein the processor is further programmed to instruct the frequency synthesizer to scale the return carrier to a return frequency band.

8. A method, comprising:
   causing a reference signal that has been extracted from a received signal to be provided to a frequency lock loop to generate an output reference clock based on the reference signal;
   determining an estimated Doppler shift of the received signal based at least in part on a velocity of the mobile terminal;
   instructing a frequency synthesizer to generate a return carrier based at least in part on the output reference clock and the estimated Doppler shift; and
   instructing a transmitter to transmit a return transmit signal based at least in part on the return carrier.

9. The method of claim 8, further comprising;
   determining the estimated Doppler shift of the received signal based in part on a position of the mobile terminal.

10. The method of claim 9, wherein the frequency of the return carrier is compensated for a first Doppler shift of the received signal and a second Doppler shift of the return transmit signal.

11. The method of claim 9, further comprising:
    receiving positioning data of the mobile terminal; and
    determining the position and velocity of the mobile terminal based on the positioning data.

12. The method of claim 11, wherein the Doppler shift is determined based on the positioning data at a first time and a second time.

13. The method of claim 8, wherein the frequency lock loop locks to the frequency of the reference signal.

14. The method of claim 8, further comprising:
    instructing the frequency synthesizer to scale the return carrier to a return frequency band.

15. A system comprising:
    a mobile receiver that is programmed to:
      receive a radio frequency signal,
      extract a reference signal from the radio frequency signal, and
      output the reference signal;
    a frequency lock loop that is programmed to generate an output reference clock based on the reference signal;
    a Doppler correction unit programmed to determine an estimated Doppler shift of the received signal based at least in part on a velocity of the mobile terminal;
    a frequency synthesizer programmed to generate a return carrier based at least in part on the output reference clock and the estimated Doppler shift; and
    a transmitter configured to transmit a return transmit signal based at least in part on the return carrier.

16. The system of claim 15, wherein the Doppler correction unit is further programmed to determine the estimated Doppler shift of the received signal based in part on a position of the mobile terminal.

17. The system of claim 16, wherein the frequency of the return carrier is compensated for a first Doppler shift of the received signal and a second Doppler shift of the return transmit signal.

18. The system of claim 16, further comprising:
    a global positioning system programmed to receive positioning data of the mobile terminal; wherein the determination of the Doppler shift is based at least in part on the positioning data.

19. The system of claim 18, wherein the Doppler shift is determined based on the positioning data at a first and a second time.

20. The system of claim 15, wherein the frequency lock loop locks to the frequency of the reference signal.

21. The system of claim 15, wherein the frequency synthesizer is further programmed to scale the return carrier to a return frequency band.

* * * * *